United States Patent [19]

Broding

[11] 3,952,283
[45] Apr. 20, 1976

[54] GROUP RECORDER ALARM
[75] Inventor: Robert A. Broding, Tulsa, Okla.
[73] Assignee: Standard Oil Company, Chicago, Ill.
[22] Filed: Dec. 4, 1974
[21] Appl. No.: 529,308

[52] U.S. Cl. .......................... 340/15.5 TS; 340/283; 340/421; 346/33 C
[51] Int. Cl.[2] ...................... G01V 1/24; G01V 1/22
[58] Field of Search ......... 340/15.5 TS, 224, 253 B, 340/275, 283, 421, 346/33 C

[56] References Cited
UNITED STATES PATENTS

| | | | |
|---|---|---|---|
| 3,316,996 | 5/1967 | Ball et al. | 340/15.5 TS |
| 3,806,864 | 4/1974 | Broding et al. | 340/15.5 TS |
| 3,886,494 | 5/1975 | Kostelnicek et al. | 340/15.5 TS |

Primary Examiner—Maynard R. Wilbur
Assistant Examiner—H. A. Birmiel
Attorney, Agent, or Firm—Paul F. Hawley

[57] ABSTRACT

This invention concerns a status alarm for a seismometer group recorder. In using group recorders, the automatic recording feature leaves the field personnel (the user) with minimum confidence that operations are satisfactory, in the absence of a status alarm. An alarm functions when a particular group recorder has been energized and is presumptively ready for operation. The alarm system is actuated only when the major systems within the group recorder are ready to operate. The alarm may be either visual or aural or both.

5 Claims, 1 Drawing Figure

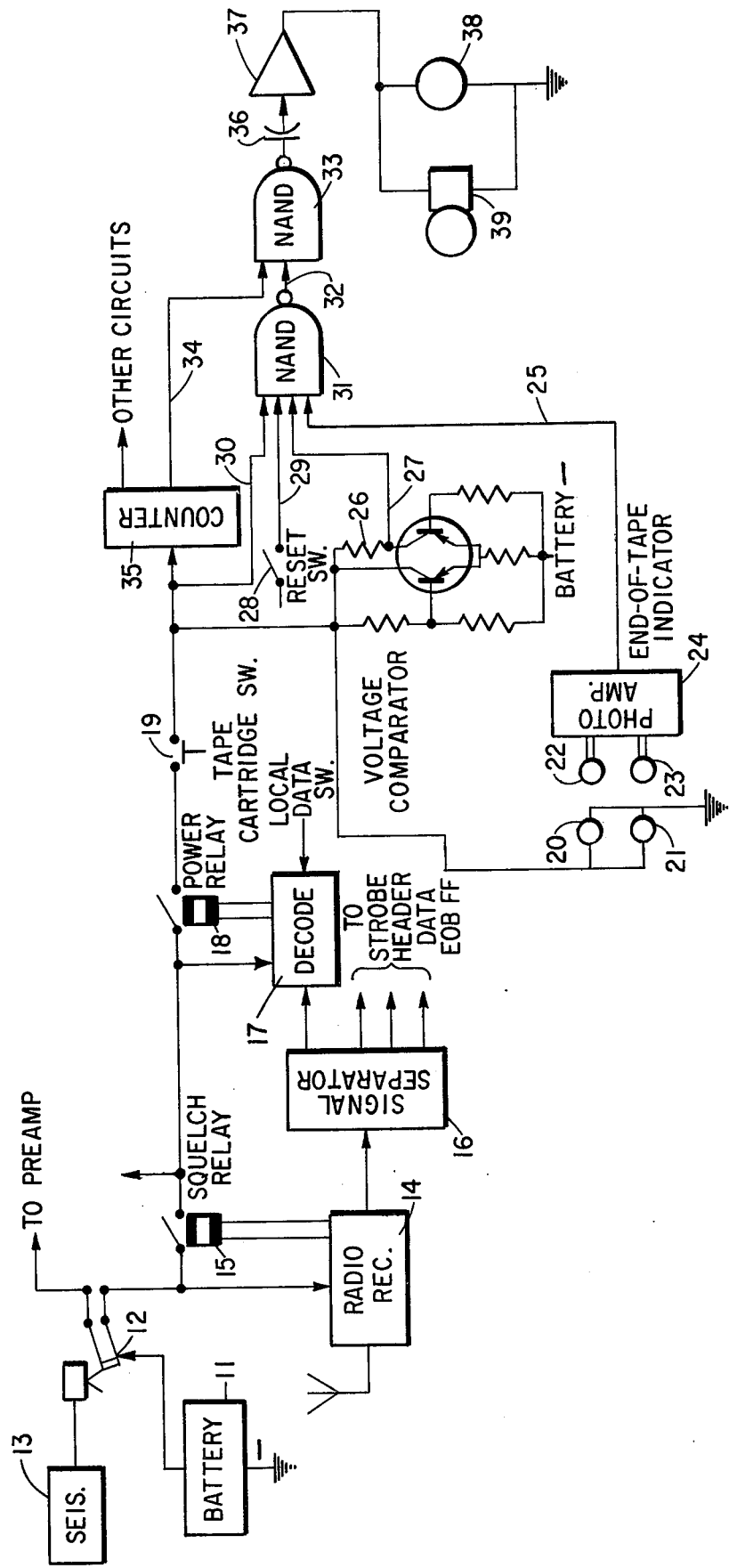

GROUP RECORDER ALARM

BACKGROUND OF THE INVENTION

1. Field of the Invention

This invention is based on the earlier invention of the seismometer group recorder, which is a field system for recording seismic signals at a plurality of geophones in a spread without the need for connecting the individual geophones through cables to a recording truck. Each of the group recorders is a small portable recording unit placed near the center of the seismometer group location and operated such that upon specific "call" from the communications link of a central control unit, a particular designated one or set of the group recorders present in the field are turned on and are thus ready to record as soon as the seismic source is actuated. However, the operating people need to have a signal perceptible from 20 to 100 feet away or more, that the proper designated recorders are now functional.

2. Description of the Prior Art

It is well known to have some sort of a visual or aural indication when a piece of electronic equipment is energized or switched on, such as a glowing pilot bulb. However, in the field of seismic prospecting, it has not been considered important in the past to have more than a single pilot light per amplifier, which did no more than indicate that that particular amplifier had been energized.

On the other hand, upon the invention of the seismometer group recorder (the subject matter of U.S. Pat. No. 3,806,864), there was need for a quite different system which will tell the field forces using the equipment the status of the recorders selected out of the total by the use of the transmission or communications link. It should be recalled that in this system there are a large number of geophones connected in groups to recorders scattered along the spread, and that ordinarily not over about half the group recorders are switched on before a shot or other source produces the seismic waves which are recorded, by the communications link (frequently a radio). This sent out very rapidly a set of coded signals each of which turned on an individual group recorder. Now it is necessary not only to be assured of the fact that the battery in the device has been switched on, but that there are geophones connected to the group recorder, a tape cassette has been inserted, the tape in the cassette has not been used up, the battery voltage is above a specified minimum, etc. When it is recalled that the cost of the data obtained on the cassette tapes is large and that frequently the data is literally nonreplaceable, it can be seen that there is a very strong interest in assuring that the equipment is in good working order immediately before a seismic record is made. Furthermore, the various group recorders may be scattered up and down a line well over a mile in length, so that it is not practical to have enough field men required to visit each station in turn and notice if the recorder is ready for operations. Having an aural signal or a flashing light at each recorder indicating that all is ready immediately prior to recording makes this a much easier task.

SUMMARY OF THE INVENTION

The major object to be accomplished by this invention has been set out above: When individual group recorders are turned on (for example by a radio or the like), the unit generates a signal, either visual or aural, which indicates that the major connections have been made to the units inside the recorder and that the units are in regular working condition.

BRIEF DESCRIPTION OF THE DRAWING

The attached FIGURE is a block wiring diagram of a preferred embodiment of the invention showing how a single circuit is completed through key elements of the major functional portions of the seismic group recorder as the unit is energized.

DETAILED DESCRIPTION OF THE DRAWINGS

Status "alarms" generally involve visual or aural means. Visual indicators to be used in sunlight require either high power (which for a unit such as described herein involves excessive weight of batteries) or a stroboscopic light which is flashed on and off, and which has only a very low duty cycle. Resonant chamber alarm devices are also economical of power and are therefore useful aural alarms.

The simplest arrangement of apparatus involves a series circuit actuated by the battery in the group recorder. The elements of this recorder and their relationship to each other have already been described in U.S. Pat. No. 3,806,864 mentioned above. Attention is directed particularly to FIG. 4 of that patent because much of the circuitry in the attached drawing involves elements that are shown in their complete relationship in FIG. 4. Connections not involving the status alarm are in general not given in this drawing.

The storage battery 11 preferably is connected on one side to the common return (indicated as a ground); on the other side is connected to a terminal of an input jack 12. Thus, when a geophone 13 is connected to jack 12, the radio receiver 14 is energized. Put another way, the radio which is to receive the "turn on" signal cannot be energized unless a geophone is already connected. Apparatus other than a jack can be employed; in fact, if as is the usual case several geophones 13 are to be employed simultaneously, it is desirable instead of the jack 12 to install a small switch such as a microswitch by the hinged door cover which is used to cover the opening to the geophone connections. When this door is opened so that the seismometers can be plugged into the recorder, this switch will automatically close. This switch replaces one jack connection to connect the battery 11 to the radio receiver 14.

At this time, the squelch relay 15 is not energized. When the radio receiver 14 receives a carrier signal from the transmitter, this relay closes and the preamplifier is energized.

As is described more in detail in the U.S. patent above referred to, only the specific recorders needed for a given set of record traces are turned on from the control transmitter, typically by transmitting a set of coded signals over the communications link. Preferably, the carrier is modulated by various tone signals, which are passed to a signal separator 16, containing various filters and logic circuits not shown in detail. One unit connected to the signal separator is a decoder 17. The BCD-coded address signals received from the communications link are routed by separator 16 to this decoder 17 which is preset with local data to be actuated only if one particular coded signal is received. Consequently, the power relay 18 (which is the output mechanism for the decoder unit 17) latches only if in the received signal is a code which matches that already set into the decoder unit 17. Otherwise, no power is transmitted to the main recorder and to the tape transport circuits of the unit.

It is essential in making the seismic records that the tape cartridge or cassette has been inserted in the unit, and that the tape has not reached the end of its useful recording length. Accordingly, a microswitch or the like 19 is mechanically located inside the recorder at such a spot that the contacts of the switch 19 are closed only when the tape cartridge or cassette has been properly inserted in its slot in the recorder. Also, as soon as switch 19 closes, several other units are energized including a pair of miniature light sources 20 and 21 which are focussed by optical apparatus (not shown) to register on a corresponding pair of photo cells or equivalent 22 and 23, the spacing between the light paths being exactly the same as the spacing in the opaque tape for a pair of punched holes at the end of the tape. Thus, when light from the sources 20 and 21 reach the photoelectric units 22 and 23, the photoamplifier 24 is energized and produces a signal on line 25. To be more correct, the voltage output on line 25 is high when the light from the sources 20 and 21 does *not* reach the photoelectric cells; and this signal becomes *low* when the end of tape is actually reached.

At the same time that the end-of-tape indicator is energized, the voltage comparator 26 is energized. This is an essentially standard circuit in which the voltage of what should be two balanced amplifiers are compared and the difference is applied to an output lead 27. When the battery voltage is at its normal useful level, there will be a high steady signal on line 27, while if the applied battery voltage be low, and the unit should be not considered in a recording capacity, this signal will also be *low*.

As is described in greater detail in the above patent, there is a reset circuit for resetting the various counters and flipflops in the seismic recorder. This is symbolically represented by the reset switch 28. Accordingly, there will be a *high* signal of a steady nature on ine 29 when the reset switch is closed.

Finally, a line 30 is directly connected to the battery line itself and therefore supplies a signal which is high when the battery is connected and zero when it is not.

All four signals, i.e., those on lines 25, 27, 29, and 30, respectively, pass through gate 31. This gate is a negative AND gate; the output of the NAND gate 31 is low when high signals appear on all four lines.

By conductor 32, the output of this NAND gate is imposed on one of two input terminals of the NAND gate 33. The second terminal to this NAND gate comes from line 34 connected to a terminal of a counter 35 which has been energized when the tape cartridge motor and the like were energized. This counter is set such that there is sufficient time after application of the signal through switch 19 and before line 34 is energized so that the alarm drive is delayed until steady values appear on lines 25, 27, 29 and 30. Thus, when the signals on 32 and 34 go low, there will be a raising of the signal on the output of gate 33. This output is condenser-coupled through capacitor 36 to the input to amplifier 37, also energized by the battery 11.

As a result, there will be an output from amplifier 37 only if the geophones have been coupled to the group recorder, the radio receiver has received a signal, the signal contained the code for this particular recorder, a tape cartridge was in place but the end of the tape had not been reached, the voltage comparator showed that the battery voltage was adequate, and the system rese has been checked.

The output of the amplifier 37 will be applied only i a transient fashion, because of the time constant of th coupling circuit including condenser 36 and the inpu circuit resistance of amplifier 37. Conventionally would like to have this time constant of the order of 1 to 15 seconds, so that there will be neither an inordi nate drain from the battery nor a premature stoppag of the output status indicators. One of these statu indicators is aural, preferably the well-known resonan chamber alarm 38. Ordinarily it can be heard of th order of 100 feet away. If desired, parallel with it is strobe light flasher 39 for visual presentation. Suc flashers can be observed from 500 feet away.

It is to be understood that if desired the circuit 34 ca be eliminated along with its function and in that case i is simply necessary to connect the output of a suitabl NAND gate taking the place of unit 31 to the input t the power amplifier so that the status alarm sound when all signals on the input to the NAND circuit coin cide.

Aural devices such as the resonant chamber alarr can be easily obtained with an interrupter so that ther is an intermittent or interrupted rather than continuou sound. This is desirable as an aid to detection. In fac it should be understood that the status alarm aurá sounder or the stroboscopic flasher offers a means fo finding a group recorder which has somehow becom hidden from the field men as for example when it i placed in high grass, in a swamp, or becomes covere with sand or snow, etc.

It should also be understood that if it is desired, th location device arrangement can be employed with slight change in the circuit. In this case, instead c having one decode unit 17, one would employ tw decode units of this type with different local code inserted, two power relays 18, one of which is cor nected as shown in the figure, and the other of whicl responsive to the second decoder, would be connecte directly to a power amplifier and a beeper circuit c alarm. A hand transmitter which could be carried b whoever is searching out the units could be turned o the carrier being modulated with the special decod tone. Whenever this signal is being transmitted, th second power relay would close and the beeper woul operate, thus tending to let the operator "home in" c the various units.

The above specification has described a status alar which provides geophysical field personnel a means f( detecting from some distance when a seismic grou recorder unit is nonfunctional without having to veri the actual tape recording. Field personnel working c the line hear the aural alarm or see the blinking lig when they are in the vicinity of a recorder, and th know that the unit is in working condition. Should unit be lost temporarily, the alarm can be turned on help in locating the unit.

I claim:

1. A status indicator integral with a seismic grou recorder which is activated by a communications lin said indicator producing an indication remote fro said recorder, including:
  a source of electric energy,
  normally open first switching means closed by co nection of at least one geophone to said record
  normally open second switching means closed loading a tape cassette in said recorder, normally closed third switching means opened by the recording tape in said cassette reaching the end of its recording position, normally open fourth switching means closed by individual code signal received from said communication link, an electric alarm capable of producing a perceptible signal mounted outside said recorder, and a circuit connecting in series said alarm, said source, and said first, second, third, and fourth switching means.

2. Apparatus as in claim 1 additionally including a coupling circuit in said circuit between said switching means and said alarm so that upon actuation of said switching means, said alarm is only temporarily connected to said source.

3. Apparatus as in claim 2 additionally including a voltage comparator, the output of which produces a voltage proportional to the charge on said source, a charged reset switching means, and a NAND gate, said output of said comparator, one end of said third switching means, and one end of said reset means being connected to the inputs of said NAND gate, and the output of said NAND gate being connected to said coupling circuit.

4. Apparatus as in claim 3, in which said alarm comprises an aural signal means.

5. Apparatus as in claim 3, in which said alarm comprises a flashing light.

* * * * *

UNITED STATES PATENT OFFICE
CERTIFICATE OF CORRECTION

Patent No. 3,952,283              Dated April 20, 1976

Inventor(s) Robert A. Broding              Page 1 of 2

It is certified that error appears in the above-identified patent and that said Letters Patent are hereby corrected as shown below:

Columns 3 and 4 should read as shown on the attached sheet.

Signed and Sealed this

Fourteenth Day of September 1976

[SEAL]

Attest:

RUTH C. MASON
Attesting Officer

C. MARSHALL DANN
Commissioner of Patents and Trademarks is transmitted to the main recorder and to the tape transport circuits of the unit.

It is essential in making the seismic records that the tape cartridge or cassette has been inserted in the unit, and that the tape has not reached the end of its useful recording length. Accordingly, a microswitch or the like 19 is mechanically located inside the recorder at such a spot that the contacts of the switch 19 are closed only when the tape cartridge or cassette has been properly inserted in its slot in the recorder. Also, as soon as switch 19 closes, several other units are energized including a pair of miniature light sources 20 and 21 which are focussed by optical apparatus (not shown) to register on a corresponding pair of photo cells or equivalent 22 and 23, the spacing between the light paths being exactly the same as the spacing in the opaque tape for a pair of punched holes at the end of the tape. Thus, when light from the sources 20 and 21 reach the photoelectric units 22 and 23, the photoamplifier 24 is energized and produces a signal on line 25. To be more correct, the voltage output on line 25 is high when the light from the sources 20 and 21 does *not* reach the photoelectric cells; and this signal becomes *low* when the end of tape is actually reached.

At the same time that the end-of-tape indicator is energized, the voltage comparator 26 is energized. This is an essentially standard circuit in which the voltage of what should be two balanced amplifiers are compared and the difference is applied to an output lead 27. When the battery voltage is at its normal useful level, there will be a high steady signal on line 27, while if the applied battery voltage be low, and the unit should be not considered in a recording capacity, this signal will also be *low*.

As is described in greater detail in the above patent, there is a reset circuit for resetting the various counters and flipflops in the seismic recorder. This is symbolically represented by the reset switch 28. Accordingly, there will be a *high* signal of a steady nature on ine 29 when the reset switch is closed.

Finally, a line 30 is directly connected to the battery line itself and therefore supplies a signal which is high when the battery is connected and zero when it is not.

All four signals, i.e., those on lines 25, 27, 29, and 30, respectively, pass through gate 31. This gate is a negative AND gate; the output of the NAND gate 31 is low when high signals appear on all four lines.

By conductor 32, the output of this NAND gate is imposed on one of two input terminals of the NAND gate 33. The second terminal to this NAND gate comes from line 34 connected to a terminal of a counter 35 which has been energized when the tape cartridge motor and the like were energized. This counter is set such that there is sufficient time after application of the signal through switch 19 and before line 34 is energized so that the alarm drive is delayed until steady values appear on lines 25, 27, 29 and 30. Thus, when the signals on 32 and 34 go low, there will be a raising of the signal on the output of gate 33. This output is condenser-coupled through capacitor 36 to the input to amplifier 37, also energized by the battery 11.

As a result, there will be an output from amplifier 37 only if the geophones have been coupled to the group recorder, the radio receiver has received a signal, the signal contained the code for this particular recorder, a tape cartridge was in place but the end of the tape had not been reached, the voltage comparator showed that the battery voltage was adequate, and the system reset has been checked.

The output of the amplifier 37 will be applied only in a transient fashion, because of the time constant of the coupling circuit including condenser 36 and the input circuit resistance of amplifier 37. Conventionally I would like to have this time constant of the order of 10 to 15 seconds, so that there will be neither an inordinate drain from the battery nor a premature stoppage of the output status indicators. One of these status indicators is aural, preferably the well-known resonant chamber alarm 38. Ordinarily it can be heard of the order of 100 feet away. If desired, parallel with it is a strobe light flasher 39 for visual presentation. Such flashers can be observed from 500 feet away.

It is to be understood that if desired the circuit 34 can be eliminated along with its function and in that case it is simply necessary to connect the output of a suitable NAND gate taking the place of unit 31 to the input to the power amplifier so that the status alarm sounds when all signals on the input to the NAND circuit coincide.

Aural devices such as the resonant chamber alarm can be easily obtained with an interrupter so that there is an intermittent or interrupted rather than continuous sound. This is desirable as an aid to detection. In fact, it should be understood that the status alarm aural sounder or the stroboscopic flasher offers a means for finding a group recorder which has somehow become hidden from the field men as for example when it is placed in high grass, in a swamp, or becomes covered with sand or snow, etc.

It should also be understood that if it is desired, the location device arrangement can be employed with a slight change in the circuit. In this case, instead of having one decode unit 17, one would employ two decode units of this type with different local codes inserted, two power relays 18, one of which is connected as shown in the figure, and the other of which, responsive to the second decoder, would be connected directly to a power amplifier and a beeper circuit or alarm. A hand transmitter which could be carried by whoever is searching out the units could be turned on, the carrier being modulated with the special decode tone. Whenever this signal is being transmitted, the second power relay would close and the beeper would operate, thus tending to let the operator "home in" on the various units.

The above specification has described a status alarm which provides geophysical field personnel a means for detecting from some distance when a seismic group recorder unit is nonfunctional without having to verify the actual tape recording. Field personnel working on the line hear the aural alarm or see the blinking light when they are in the vicinity of a recorder, and thus know that the unit is in working condition. Should a unit be lost temporarily, the alarm can be turned on to help in locating the unit.

I claim:

1. A status indicator integral with a seismic group recorder which is activated by a communications link, said indicator producing an indication remote from said recorder, including:
   a source of electric energy,
   normally open first switching means closed by connection of at least one geophone to said recorder,
   normally open second switching means closed by loading a tape cassette in said recorder.